United States Patent
Queenan

(10) Patent No.: US 9,202,323 B2
(45) Date of Patent: Dec. 1, 2015

(54) SECURE ELECTRONIC COMPARTMENT IDENTIFIER SYSTEM

(76) Inventor: Joseph A. Queenan, Columbia, SC (US)

(*) Notice: Subject to any disclaimer, the term of this patent is extended or adjusted under 35 U.S.C. 154(b) by 2697 days.

(21) Appl. No.: 10/771,480

(22) Filed: Feb. 3, 2004

(65) Prior Publication Data

US 2004/0246097 A1 Dec. 9, 2004

Related U.S. Application Data

(63) Continuation-in-part of application No. 10/454,909, filed on Jun. 5, 2003, now abandoned.

(51) Int. Cl.
| | |
|---|---|
| B61L 25/04 | (2006.01) |
| G01S 13/78 | (2006.01) |
| G07C 9/00 | (2006.01) |
| G08B 5/40 | (2006.01) |

(52) U.S. Cl.
CPC ........ G07C 9/00103 (2013.01); G07C 9/00571 (2013.01); G07C 9/00722 (2013.01); *G07C 9/00896* (2013.01)

(58) Field of Classification Search
CPC ....................................................... B61L 25/04
USPC .............. 340/5.6, 5.61, 5.7, 5.73, 551, 545.6, 340/568.1, 10.1–10.5; 713/185, 182, 166, 713/193; 380/44–47
See application file for complete search history.

(56) References Cited

U.S. PATENT DOCUMENTS

| | | | |
|---|---|---|---|
| 4,851,652 A | 7/1989 | Imran | |
| 5,008,661 A * | 4/1991 | Raj | 340/10.51 |
| 5,046,084 A * | 9/1991 | Barrett et al. | 379/102.06 |
| 5,629,981 A | 5/1997 | Nerlikar | |
| 6,097,306 A * | 8/2000 | Leon et al. | 340/5.1 |
| 6,265,973 B1 | 7/2001 | Brammall et al. | |
| 6,317,028 B1 | 11/2001 | Valiulis | |
| 6,424,260 B2 * | 7/2002 | Maloney | 340/568.1 |
| 6,472,973 B1 | 10/2002 | Harold et al. | |
| 6,483,434 B1 | 11/2002 | UmiKer | |
| 6,504,470 B2 | 1/2003 | Puchek et al. | |
| 6,539,755 B1 | 4/2003 | Bruwer et al. | |
| 6,542,076 B1 | 4/2003 | Joao | |
| 6,747,558 B1 * | 6/2004 | Thorne et al. | 340/551 |
| 6,803,674 B2 * | 10/2004 | Crisp | 307/10.2 |
| 6,879,710 B1 * | 4/2005 | Hinoue et al. | 382/124 |
| 7,009,489 B2 * | 3/2006 | Fisher | 340/5.7 |
| 7,134,015 B2 * | 11/2006 | Kulack et al. | 713/166 |
| 7,219,235 B2 * | 5/2007 | Rumble | 713/185 |
| 2003/0179073 A1 * | 9/2003 | Ghazarian | 340/5.6 |

OTHER PUBLICATIONS

C. H. Deutsch, B.J. Feder, "A Radio Chip in Every Consumer Product", NY Times Feb. 25, 2003.

* cited by examiner

*Primary Examiner* — Nam V Nguyen
(74) *Attorney, Agent, or Firm* — Barnes & Thornburg LLP

(57) ABSTRACT

A latch, or tag that can be used on luggage, baggage, trunks, rail cars, trailers or any compartment that can be opened and closed that establishes profile data that is associated with the latch or tag and is adapted to store personal data and an identifier in the latch mechanism or on the tag. The profile data can be used to establish a risk factor with the luggage or compartment and/or a person associated with the luggage or compartment.

60 Claims, 4 Drawing Sheets

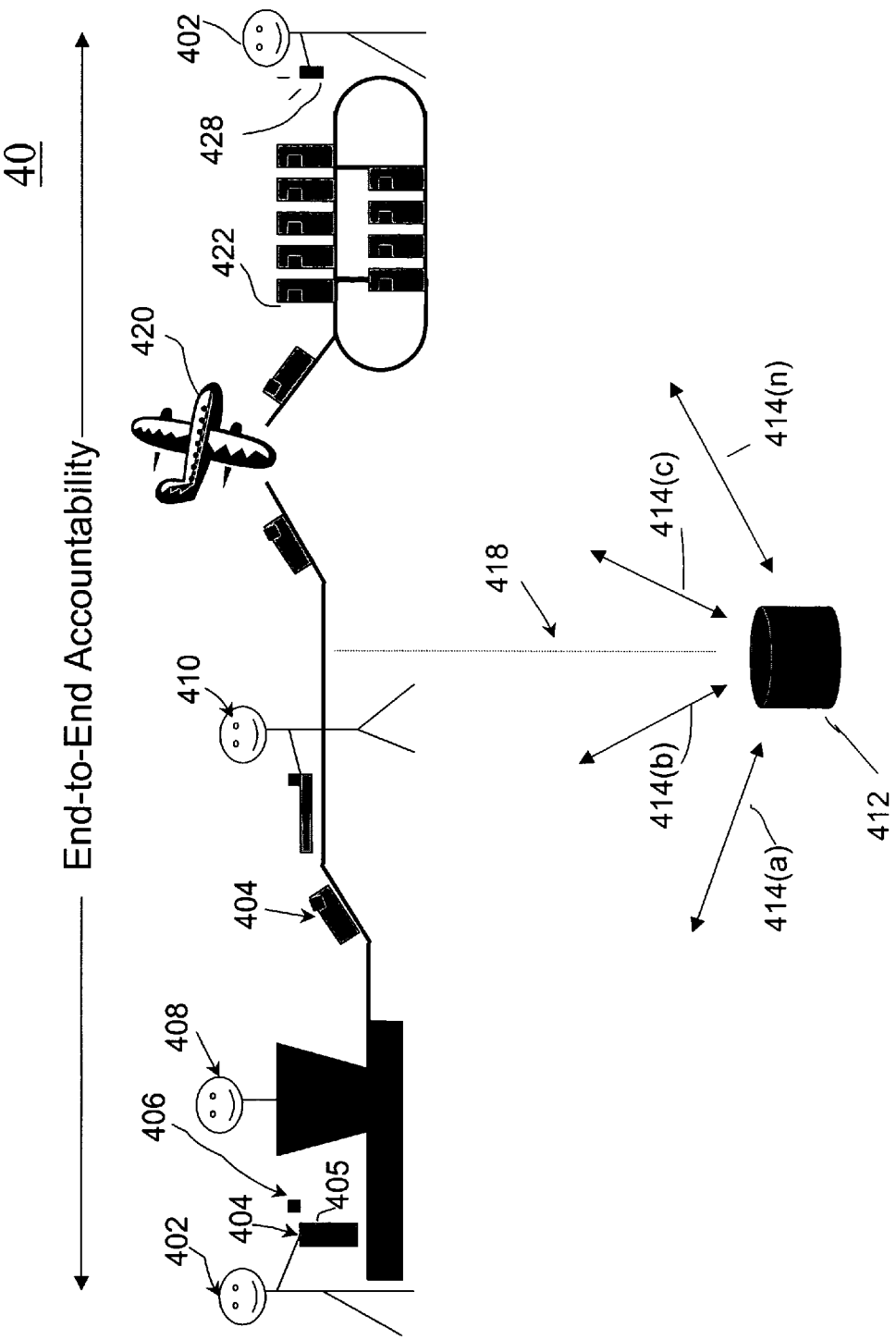

SECURE ELECTRONIC COMPARTMENT IDENTIFIER SYSTEM

RELATED APPLICATIONS

This application is a continuation-in-part of prior U.S. application Ser. No. 10/454,909 filed on Jun. 5, 2003, now abandoned, which is hereby incorporated by reference in its entirety herein.

TECHNICAL FIELD

This invention relates generally to a mechanism attached to, or part of, a bag, or container, that tracks the location of the bag, or container and a method for using the mechanism. More particularly, this invention relates to a latch mechanism, or tag that can track the opening and closing of the bag, or container, and accumulates data related to the bag, or container. The mechanism, or tag may be registered to a particular user and a manifest may be generated that reflects the contents of a particular bag, or container that the latch mechanism or tag is mounted on.

BACKGROUND

Currently, there is a growing concern about the ability for people to illegally transport, toxic, dangerous, explosive or hazardous material, either overland, for example, by tractor-trailer or railroad, or on commercial airplanes via carry-on or checked luggage. This concern is exacerbated by the fact that the ability for authorized personnel to reliably check for such materials, and to maintain records, is limited.

In order to minimize the risk of airline passengers or others transporting such materials on airplanes, the Transportation Safety Administration (TSA), which is a federal agency, screens baggage at all commercial airports in the United States, in an attempt to provide security to airlines and passengers. This screening process typically involves searching luggage and bags that are carried by passengers and "checked" (i.e., placed in a cargo compartment of the aircraft). In order to facilitate this screening process for checked luggage and bags, the TSA suggests that travelers keep their bags unlocked, if the bag is unlocked, the TSA will open and screen the bag. If the bag is locked, locks will be broken and removed. TSA officials will, typically, then secure bags and luggage with a plastic strip and will attempt to leave a note indicating that the bag was screened.

The above-described process gives rise to a host of problems. One problem is that, in instances in which bags are not locked, the bags are not secure, which enables unauthorized people to have access to a bag. Secondly, the present process lacks accountability of the screener. Thus, a screener could, either on purpose or inadvertently, remove contents of the luggage or bag during the screening process and there is no accountability to determine which individual (either a screener or other parson) had access to the bag and may have removed the contents.

Furthermore, once the plastic tie has been placed on the bag, it may be difficult for the traveler to remove the plastic tie upon reaching their final destination. The plastic ties cannot be reused once they are removed from a bag.

Conventional locks and latching mechanism are not adequate to solve the above-described problems. For example, one conventional approach is disclosed in U.S. Pat. No. 6,472,973, entitled, "Information Collection And Disseminator For A Realty Lock Box" issued to Harold et al., that discloses an information collector and disseminator for a realty lock box in which a wireless radio link is added to a real estate lock box to transfer data obtained from the access key pad to a nearby receiver, which sends the data to a central site computer and compiles the data for dissemination. The lock box can also be controlled from a central site via a radio link. While such a lock is useful in the real estate context, this type of lock does not fulfill the needs for a compartment or luggage lock.

Another conventional lock is disclosed in U.S. Pat. No. 4,851,652, issued to Imran, entitled, "Electronic Lock Box, Access Card, System And Method." This patent discloses a lock box in a secure entry system for use with a source of DC power having high frequency pulse width modulation thereon including a housing and a key container mounted in the housing movable between accessible and inaccessible positions. Circuitry is provided within the housing for controlling the movement of the key container and is adapted to be connected to the source of DC power. The circuitry is capable of receiving the high frequency pulse width modulated DC power. A capacitor serves to supply at least some of the power required by the circuitry during the time the pulse width modulation is occurring on the DC power supplied. While this patent solves the problem of preventing access to the lock by blunt force, such as a hammer blow, it does not adequately solve the problem of tracking the opening and closing of a lock.

Therefore, what is needed is a system that provides controlled/restricted access and accountability into the screening process of luggage or other compartments.

SUMMARY OF THE INVENTION

Thus, in order to overcome the drawbacks and limitations of conventional locking mechanisms, particularly locks for luggage, baggage, railcars, trailers and the like, one embodiment of the present invention is directed to a method for establishing profile data that is associated with a latch mechanism or a tag. The method includes obtaining personal data associated with a user; obtaining an identifier that identifies a latch mechanism, or tag; associating the personal data with the identifier; and storing the personal data and the identifier in the latch mechanism, or tag.

Another embodiment of the invention is one in which the method as described above includes assigning a risk level for the latch mechanism or tag as a function of a first indicator and a second indicator; storing the risk level; and modifying the risk level.

Yet another embodiment of the present invention is one in which the method as described above further includes tracking the profile data; and updating the profile data.

Yet another embodiment of the present invention is directed to the method as described above that further includes generating profile data and storing and/or outputting the profile data.

Yet another embodiment of the present invention relates to an apparatus that includes a database that stores data relating to activity of a lock mechanism or tag. An input/output module inputs data relating to a particular lock mechanism or tag, the input data relates to times at which the lock mechanism was engaged or the tag was scanned or otherwise processed, and locations at which that activity occurred.

BRIEF DESCRIPTION OF THE DRAWINGS

FIG. 4 shows a system in which the present invention may be used to enable accountability of a latch, or lock or tag.

DETAILED DESCRIPTION OF THE INVENTION

The above-mentioned drawbacks and disadvantages are overcome by the present invention. The present invention provides a secure, efficient and accountable screening process and system that uses an accountable secure lock or tag that identifies and tracks compartments, luggage, bags or other containers.

Figure 1:
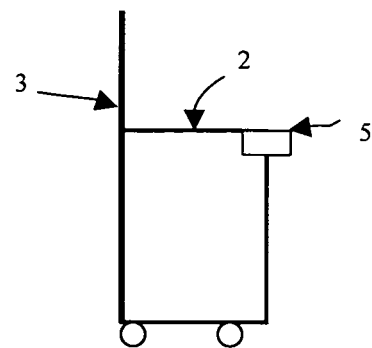
FIG. 1 shows a perspective view of a piece of luggage, or container that includes a lock mechanism, or tag according to the present invention.

FIG. 1 shows a perspective view of a compartment 2, which is shown as a piece of luggage, but could also be a bag, compartment or other container. The luggage 2 has handle 3 and a lock 5. The lock 5 is a portable electronic lock that ensures only those authorized can open the luggage. Authorized persons may include, for example, the owner of the luggage and/or a baggage screener. The lock 5 may have essentially any dimensions, and the dimensions are not critical to the understanding of the invention. One possible lock may have dimensions of approximately 6 inches by 4 inches and integrates an electronic radio frequency identification (RFID) lock and key system that enables tracking and monitoring the opening and closing of the lock. The lock 5 may be accessed or engaged by one or more user keys, which have dimensions of approximately a credit card. (User keys not shown in FIG. 1.) Universal master keys, or engagement devices, are keys or devices that have a memory portion thereon. (Master keys not shown in FIG. 1.) The master keys are assigned to a security screener to enable the screener to open the luggage. The master keys can be recharged and reassigned.

While FIG. 1 shows the lock 5 mounted on a piece of luggage 2, the lock 5 may also be mounted on a larger compartment, such as a rail car, trailer, automobile, or other storage device. The lock 5 may also be mounted on other objects as well, for example, a laptop computer, jewelry case, rental locker, boat rack or other compartment or area.

The lock 5 may be mounted on the luggage or may be removable, based on the needs of the user. The lock 5 may be attached to a cable, which enables the lock to be affixed to various compartments. The cable secures the lock to a bag, piece of luggage, rail car, trailer, or other compartment.

The lock 5 may be substituted for, or used in conjunction with, a tag, or label or printed medium that has an RF coded portion that stores information relating to the user, passenger or owner of the luggage. The tag can be printed with identifier data, such as a person's name, address, social security number, or biometric information, such as a fingerprint scan or facial scan. This identifier data can be stored, retrieved and updated. The tag is capable of being read by a suitable device, such as a scanner and the information stored in a memory, which can be updated and modified. The memory may be attached to the luggage, compartment or container, or may be remotely located. The tag may be securely attached to the luggage, compartment or container.

Figure 2:
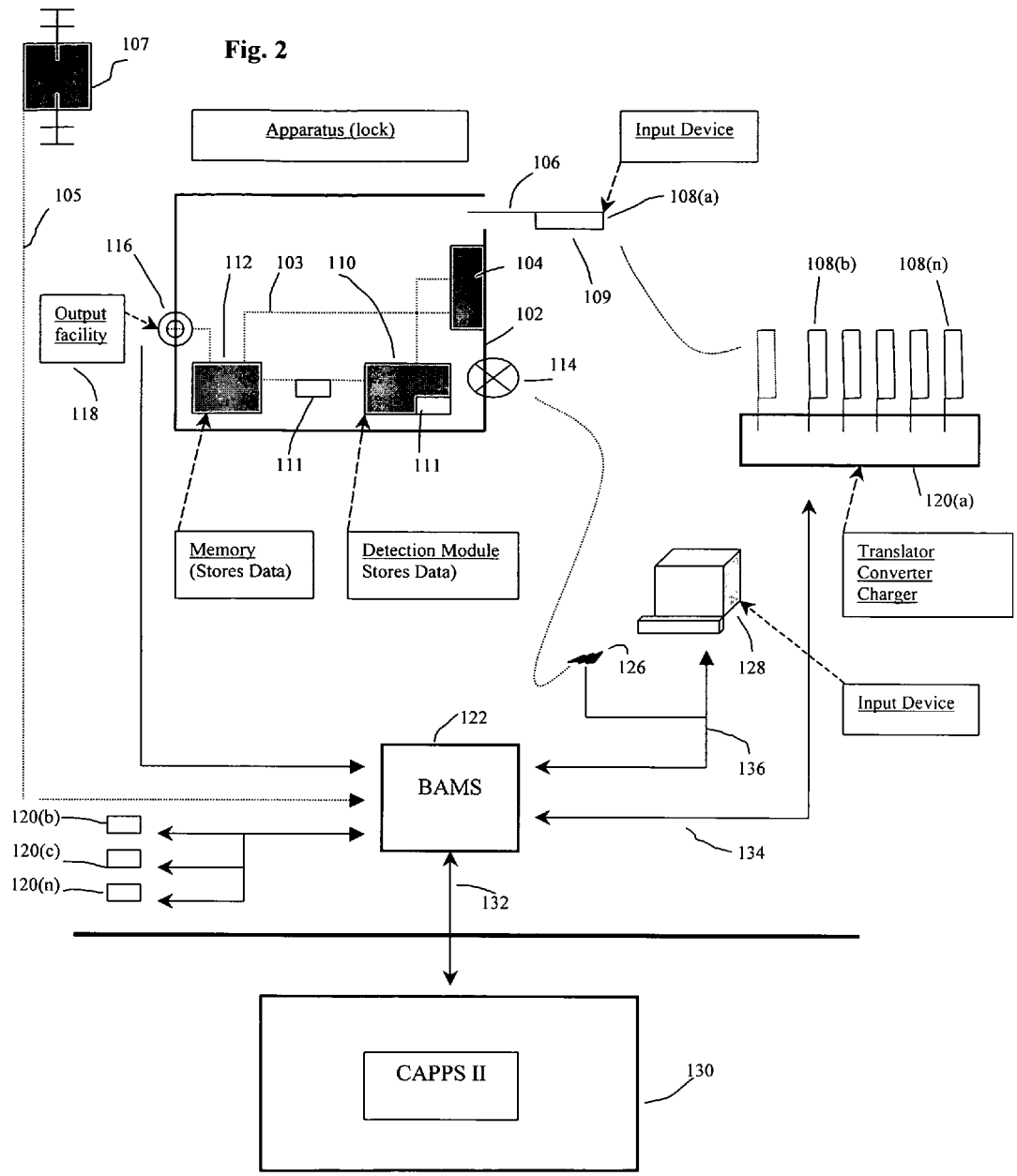
FIG. 2 shows a schematic diagram of an apparatus that includes the lock system according to the present invention.

FIG. 2 shows a schematic diagram 10 of an apparatus that includes the lock 102 of the present invention and various databases and input terminals. The apparatus enables the activation of the lock 102 to be tracked and the lock to be traced.

The lock 102, is typically mounted on a piece of luggage, bag or other compartment or container, as described herein. These containers may be for example, railroad cars, trailers, safes, laptop computers, lockers, jewelry cases or other containment devices. The lock 102 includes a latch mechanism 104 that restricts, limits or controls access to the contents of the bag, compartment or container. Although essentially any latching mechanism capable of being engaged to open is suitable, one example is a mechanism that includes a bolt, a catch and a handle, such that the bolt moves from a locked position to an unlocked position when the catch is moved by means of the handle from a latched position to an unlatched position. Information is stored when the bolt is moved from the locked position to the unlocked position.

Input devices, or engagement devices, or keys, or opening devices $108(a) \ldots (n)$, where n is any suitable number, are, for example, magnetically coded plastic cards, or smart cards, or contact tokens, or non-contact tokens or cryptographic tokens or memory cards that may be inserted into, or placed in proximity to, input port, or input mechanism, or input facility 106, so as to interface with the facility 106. Alternatively, a wireless engagement signal, which engages the latch 104, may be transmitted to the input facility 106. These access devices, or signals, generally, 108 may be issued or assigned to the owner/user of the lock or to authorized screening personnel to examine the contents of a bag. One embodiment of the present invention is that biometric information is encoded on the access cards 108. The biometric information may be, for example, fingerprint data, facial data or similar personal information that is stored on the access facility to facilitate verification of the user.

Each input device, or engagement device, or key, or opening device, or card, generally 108 includes an associated battery 109 and authorization data stored in a storage medium on the card 108. The input cards, or access devices, 108 are also referred to herein as universal cards, or master cards, or screener cards and may be issued to authorized personnel for examining or screening the contents of the luggage or compartment.

In an embodiment in which the compartment is a piece of luggage, the screeners may be airport security personnel who are issued a master card 108 to enable them to examine the contents of a passenger's bag or piece of luggage. In order for the screener to be authorized to open the luggage, the master or universal card must be programmed with authorization data. This authorization data may be programmed to enable only limited access, for example, the screener may only be able to open a specified number of bags or be able to open bags only during a specified time (i.e., a shift). The authorization data may be coded, for example with a bar code, or encrypted, or a combination of encoding and encryption.

The latch 104 is operatively coupled to detection module 110, which detects movement across the latch 104. This movement is typically engagement of the latch 104. The detection module 110 may be for example a radio frequency identification element or device, an infrared (IR) element or device, OCR (optical character recognition) device or other sensor that is adapted to detect when the latch 104 has been engaged by an authorized card or device 108.

The detection module 110 is operatively coupled to local memory 112. Local memory 112 stores data relating to detected latch activity. This data includes the time and location the lock was engaged, the card that engaged the lock and other information that may be gathered while the lock is being opened and closed. Memory 112 is coupled to latch 104 via interconnector 103. Battery module 111 provides power to the detection module 110 and the memory 112.

The memory 112 may be located within the lock 102 or outside the lock 102. Alternatively, the detection module may transmit data directly to central database 122 and obviate memory 112.

The memory 112 is also coupled to output facility, or module 116, which is for example a universal serial bus (USB), or a port that can transmit data to a storage medium such as a magnetic card, or storage card or smart card 118. Alternatively, the output facility 116 may output data, via a hard-wired or wireless connection 138 data to central database 122.

Identifier 114, which is for example, a coded representation of identifying information relating to the lock 102 or bag to which the lock 102 is affixed, stores data that correlates the lock 102 or bag to a particular user. Additional information may be associated with the identifier 114 as the bag is inspected.

Global positioning satellite (GPS) 107 is suited to receive data from identifier 114 and transmit the data to central database 122, via wireless connection 105. This information may be tracking information to track the location of the lock 102. This is particularly useful if a bag, or other compartment, with the lock 102 is lost, misdirected, or breached. Furthermore, if a traveler has a plurality of bags, it is possible to track the whereabouts of each bag.

When a bag is screened, or examined, a card, or other input device, 108, as described herein, is inserted into, or engages, input facility 106. If the key, or card, 108(a) is valid, the latch 104 will move into an open state and enable access to the contents of the compartment.

Upon completion of a shift, or other time period, the authorized person may replace the card or other input device, or master key 108 into a converter device, or translation device, 120(a). The data from the input device 108 may be uploaded, or transmitted to either a database or other electronic storage medium. Alternatively, the data may be transmitted from the device 108 and then transmitted via a wireless network to a remote location. The converter device 120(a) typically has a reader unit that receives data from a plurality of master keys 108(a) ... (n). This enables the converter 120(a) to gather and store data from each of the master keys 108(a) ... (n). This data may be for example, identifier data, which identifies each bag locked/unlocked, the time each bag was lock/unlocked and the time each bag was locked/unlocked. Data from the converter 120(a) may be provided to central database 122 via bi-directional communication link 134. This link 134 may be a telephone line, wireless connection or other data transmission medium.

Input module 128, enables an operator to input additional data to a central database 122. Input module 128 is, for example, a stand-alone computer such as a personal computer (PC) (e.g., a computer with Intel™ Pentium™ 4 processors at 2.0 GHz and 256 MB of memory), laptop computer, personal digital assistant (PDA) or other electronic device capable of storing and transmitting data. The input module 128 typically includes a mouse and/or keyboard to enable an operator to input additional data about a particular bag or compartment. For example, if an operator desires to make notes about the contents of a bag or piece of luggage, the operator can either key in the data, such as an alert, or may use soft keys or pre-programmed indicators indicating that the bag contains suspicious articles or other contraband. Input module 128 may also be coupled to a scanner 126 or other peripheral device, which can also input data into central database 122, via bi-directional communication link 136. Bi-directional communication link 136 may be similar to link 134 described above.

Central database 122 may be operatively coupled to a plurality of converter devices 120(a) ... (n), where n is any suitable number, via a bi-directional communication link. The central database 122 may also be operatively coupled to a plurality of input devices, shown herein as 128 to receive additional data. The central database 122 is adapted to process this information and provide data to other converter devices and other input devices. For example, if the contents of a bag are examined and found to contain suspicious articles or materials, an operator can input information into central database 122 either by scanner 126 or input device 128. The additional data is associated with the lock by associating the additional information with the identifier 114 at central database 122. Thus, at a subsequent location, an alert flag can be triggered, or other notice provided, when the bag is subsequently checked. This is accomplished by triggering an alert signal when the identifier tag 114 is scanned or by downloading the data to keys 108 at other locations so that when authorized personnel open the lock the key 108 provides an alarm or other indication that the lock and/or associated contents of the container have been previously identified as a heightened security risk.

As shown in FIG. 2, a plurality of converter units 120 may be used. For example, each airport or screening location may have a converter 120 that receives data from keys at that location. For example, Newark airport may have one or more converter device(s), shown as 120(a) and Denver airport may have one or more converter device(s), shown as 120(b). Each device 120(a) and (b) may be adapted to transmit data to a central database 122. This transmission means is shown as interconnector 134, which couples converter device 120(a) to central database 122. Interconnector 134 is for example a wireless or telephone line connection, wide area network (WAN) connection, local area network (LAN) connection. The central database 122 may also receive additional data from input module, or device, 128, via interconnector 136. Interconnector 136 is, for example a wireless or telephone line connection, wide area network (WAN) connection, local area network (LAN) connection. The central database 122 can transmit information received from converters 120 and input devices 128, 126 to other converters and input devices. Thus a person scanning bags in Denver will have access to the results of the scanning process that occurred in Newark.

Furthermore, customs agents in a foreign country can place latches or tags on bags, or containers. These can be inspected by U.S. customs agents upon arrival in the United States and/or inspected by U.S. agents, such as Coast Guard personnel at sea or while a vessel is docked. All the agents inspecting cargo, bags or containers will have access to the information associated with the cargo, bags or containers.

Central database 122 may also be operatively coupled to a second database 130, via bi-directional interconnector 132, which may be for example CAPPSII, a government sponsored database, thereby further disseminating the information gathered by central database 122.

Although the above description is described in terms of a lock on a piece of luggage, the present invention also applies to securing railcars, storage containers, trailers, food containers, medicine containers, radio active material containers, safes, laptop computers or other compartments.

Figure 3:
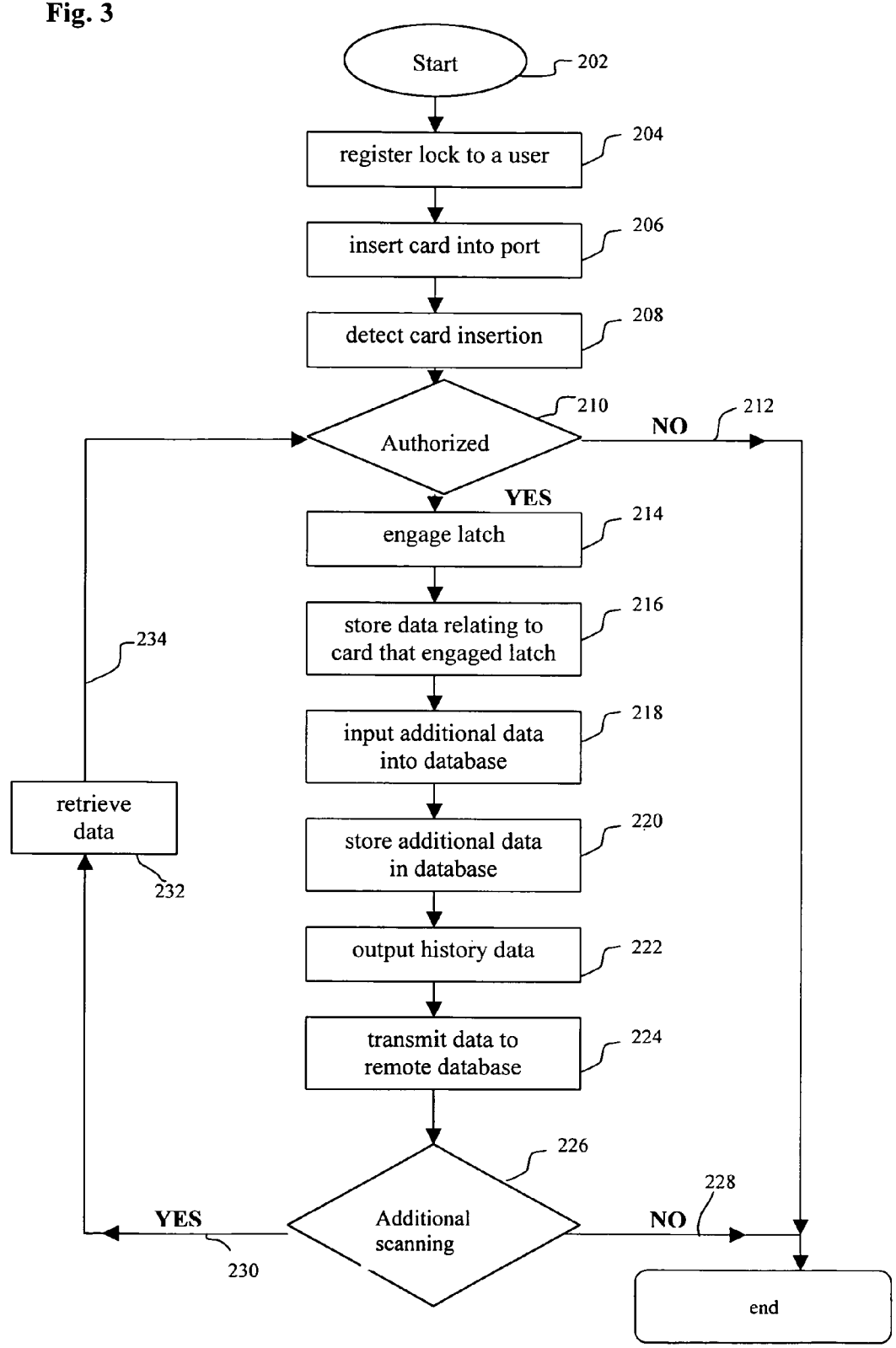
FIG. 3 shows a flowchart of steps that can be used to implement the present invention.

FIG. 3 shows a flowchart 20 of a series of steps that can be used to implement the present invention. Start block 202 begins the process. Block 204 shows that a lock is registered, or otherwise associated with, to a user. This registration may be performed on-line, via a website or over the telephone. In order to verify a user, the user must provide some verifiable form of identification, which may be encoded on a master key on a magnetic strip.

Block 206 shows that an access card, or device, or wireless signal, which may be operated by either an individual, such as the owner or assignee of the lock or authorized personnel that will be examining the contents of a compartment, is inserted into, or transmitted to, a port on the lock. The access card, or device may be for example a smart card, cryptographic token, contact token or non-contact token, or wireless signal, or other medium. The lock then detects that an authorized request has been made to engage the lock and decision block 210 determines whether the input is authorized to engage the latch. If the input is not authorized, "NO" line 212 leads to end block 236. If the input is authorized the latch is engaged, or opened, as shown in block 214. Data relating to the card, or input device that engaged the latch is stored. This data may include for example, the time the latch was engaged, an identifier of the card, or input device, that engaged the latch, the location where the latch was engaged as well as any other data that was gathered from the card, or input device.

Block 218 shows that additional data may be input into a database. This additional information may be for example, information pertaining to a bag or compartment that security personnel desires to take notice. For example, if the contents of a bag are examined and found to have a controlled substance, explosive, toxic materials or other potentially illegal or harmful material, the security personnel can input an alert code that will be associated with that particular bag or compartment. This data is stored in a database as shown in block 220. Block 222 shows that the data can be output, for example, as a manifest of the number of times the bag or compartment was opened, the locations the bag or compartment was opened and/or if there were any alert codes indicated at any time during transport of the bag or compartment. The output can be either as a printed report or an electronic document.

Block 224 shows that the tracing data (data obtained by opening and closing the bag or compartment) as well as any additional data that is input by persons examining the bag or compartment, (such as notices of contraband) may be transmitted to a remote database, which can compile and manipulate the received data to generate profiles and trends that can be used to identify potential security concerns.

Block 226 is a decision block that determines whether there are additional bags or compartments to be examined. If "YES" line 230 leads to block 232, which shows that historical, or previously obtained data can be retrieved. Line 234 then leads to block 210 that determines whether an access card is authorized to open the bag or compartment, and the process proceeds as described above. If there are no more bags or compartments to be scanned, line 228 leads to end block 236.

FIG. 4 shows an embodiment 40 of the present invention that provides for accountability of access to the compartment, or luggage, 404, which has a lock or latch mechanism 406 mounted thereon, from initial check-in until the owner, or user, 402 regains custody of the luggage 404.

A user may register with appropriate authorities to either rent or lease or buy or use a latch mechanism. This registration process enables a user to obtain a latch on an as needed basis, such as upon arrival to the airport. The user provides validating personal information and is assigned a latch.

Alternatively, a user may own a latch mechanism, typically mounted on a piece of luggage, which was purchased by the user. In order for the latch to be used, it must be authenticated by the user providing personal information that identifies the user. It is an embodiment of the present invention that more that one user may use a latch, provided the particular user provides the necessary information and the latch is registered to the particular user. For example, multiple family members may be able to use a particular latch by providing information related to each family member and then assigning a particular family member to the latch for a specific time period. This is useful when one member is traveling and needs to use the latch.

It is another embodiment of the present invention that a user may temporarily use a latch by leasing or renting the latch. The registration process is similar to the process described above. Furthermore, the user may use a credit card or debit card or other payment method to pay a user-fee associated with renting the latch. This facilitates users being able to use the latches without cumbersome payment issues.

Alternatively, the user 402 may have a tag, or label or card, 405 attached to the bag 404. The tag, or label or card 405 has identifier data printed or stored on the card 405. This identifier data may include, for example, name, date of birth, address, social security number or biometric information, such as a fingerprint scan, facial scan or other identifying information. This information is typically encoded into machine-readable form, such as a one-dimensional barcode, two-dimensional barcode, a target barcode or other coded representation. The identifier data may also be encrypted for additional security. As shown in FIG. 4, a passenger, or user, or owner, 402 "checks" the luggage 404 with appropriate airline agent 408. The luggage 404 is registered to the particular user 402 by obtaining user identifying information or personal information such as the user's name, address, social security number, passport data, biometric information, such as fingerprint, facial scan, or other data that accurately identifies or confirms the identity of the user 402.

Each latch mechanism has latch identifying information that may be used to identify the particular latch, or a selected collection or batch of latch mechanisms.

The personal data, identifying user 402, is associated with the latch mechanism 406 or tag 405 and the personal data and the latch identifier are stored in the latch, or a memory (not shown) coupled to the latch. (The memory may be disposed on the latch 406, or electronically coupled to the latch 406 via a wireless connection, such as infrared or radio frequency (RF). This association process enables the latch 406 or tag 405 to be correlated to a particular user 402. For example, when a latch, or a piece of luggage with a latch, is used by different people, such as family members, the latch can be associated with the particular user when it is registered. During the registration process the latch, which typically has a radio frequency identification (RFID) portion is enabled such that access of the latch (e.g., opening, closing, attempted opening, attempted closing and/or tampering) may be tracked.

Furthermore, as shown in FIG. 4, the luggage or bag 404 may be transported to screening personnel 410. The screening process typically involves accessing the latch 406 to open the luggage 404 so that contents of the luggage can be examined by appropriate personnel 410. Typically airport security baggage screeners 410 check for explosive, hazardous, toxic or other prohibited materials that are not permitted to be transported. The memory associated with the latch 406 can be accessed to retrieve information regarding the luggage and/or the passenger. The screening personnel 410 can update the data stored in the latch 406 by indicating that the luggage 404 was opened and the contents checked. The personnel 410 can also indicate particular conditions, such as the fact that the bag contains suspect material, such as knives, explosive constituent materials and other items, that while not prohibited, or contraband, may be indicative of potentially threatening or illegal activity. This condition can be stored in the latch 406 so that the next time the latch is accessed, the indicator will be displayed to personnel opening the luggage, or container. Additionally, the latch can be coded with an indicator that will be displayed when the latch is scanned by a scanning device, such as a scanner, available from, for example, Symbol Corp. Thus, each time the latch is accessed, the history of the latch can be retrieved and the data relating to the latch can be updated.

Thus, the latch of the present invention is used with a method to establish profile data that is associated with a latch mechanism, or tag. This includes obtaining personal data associated with a user, obtaining an identifier that identifies a latch mechanism, or tag, associating the personal data with the identifier; and storing the personal data and the identifier in the latch mechanism or on the tag, for example, in a bar code representation, an encrypted representation or a coded encrypted representation.

The profile data may be encoded and stored in the latch memory and/or remote memory coupled to with the latch. This remote memory may include profile data from a plurality of latches that has been transmitted to the remote memory.

The data relating to the latch can be stored at either a local memory location or a remote storage location, shown generally as storage location 412. When the storage location is remote, a bi-directional communication link 418 may be used to transmit the data from the baggage screening station to the storage location 412. This storage location 412 may be for example, a server or other electronic medium, for example ROM (read only memory), RAM (random access memory), PROM (programmable read only memory), EEPROM (electrically erasable PROM) or other suitable memory. The storage location 412 can store the data as well as transmit the data to other locations via bi-directional communication links 414 (*a*) ... (*n*), where n is any suitable number.

For example, data relating to a piece of luggage 404 can be obtained at first location, for example, an airport in New York and stored at a server location such that if the piece of luggage 404 is scanned at a second location, such as an airport in Texas, the data relating to that piece of luggage 404 can be retrieved by personnel or computers located in Texas. Thus, the piece of luggage 404 can be tracked and the data relating to the access, contents, or scanning can be updated as the piece of luggage 404 is transported.

The luggage may also be assigned a risk level indicator based on the contents of the luggage or the personal data obtained from the user. This risk level indicator can be stored, either in the latch memory, or on the tag, or at the remote storage location. The risk level indicator can be updated as the luggage goes through additional screening checkpoints.

Users may also be assigned a risk level factor as a function of the contents of their luggage or the personal data, such as other destinations they have visited or other personal factors.

Specified luggage may be segregated and placed in particular areas of the aircraft as a function of the risk level factors, either the luggage risk level factor, the user risk level factor, or both.

The risk level factors may be stored in local memory, e.g., memory disposed within the latch, on the tag or in a remote memory location. In any event, the risk factors can be retrieved when the contents of the luggage are examined. Furthermore, the risk level factors can be output, such as in encoded or encrypted format and printed on the user's airline ticket or on a label to be affixed to the luggage. This enables flight personnel to identify potentially dangerous passengers whenever the passenger's ticket is scanned or observed. One example is that a passenger who is transporting knives in their suitcase can be identified as a security risk, even though the suitcase has been checked.

When the luggage 404 is removed from the airplane 420, the RFID on the latch, or tag 404 can be used to track the location of the luggage or container so that the owner or user 402 can be notified of the location of the luggage or container. For example, when the luggage is placed on a baggage carousel 422, the owner 402 can receive an indication on their cellular telephone, or other personal electronic device 428 or the person's name can be displayed on a display over the carousel 422.

Furthermore, this notification feature can be used to notify a user if the luggage 404 is opened or tampered with. The data can include the time and place of the access or attempted access. This can be done in real time as well as accumulated to provide the user with a manifest or log of latch access history.

Alternatively, the content data of the memory associated with a latch may be output in any suitable format, such as transmitted to an electronic device, such as a cellular telephone, a PDA, a printer, a facsimile machine, a computer, or other output device, shown generally in FIG. 4 as element 428. Once the content data is output, it can be displayed, for example, on an LCD display, electronic display or other display device or printed on a medium, such as a tag, label, card or ticket.

Yet another embodiment of the present invention enables a tamper resistant feature of the latch mechanism. In the event an attempt is made to force the latch into an accessed or "open" position, the latch may operate in a modified mode of operation such that an alarm condition is indicated, or the latch can seize such that it cannot be accessed. This feature provides for tamper detection and prevention.

Yet another embodiment of the present invention relates to generating a manifest based on the contents of a piece of luggage. Data relating to the contents at various points along a journey may be stored in the latch memory, or remote memory. This manifest data can be output to a display, electronic device, such as a cellular telephone, PDA or the like.

Yet another embodiment of the present invention is directed to tracking the location and contents of a container, such as a cargo container that has a latching mechanism with an RFID chip and memory. This embodiment includes accessing the latch mechanism at a first location or at a first time (first instance). A record of the first access is stored, either in a local memory disposed on the latch or at a remote storage location, or both. A subsequent access of the latch mechanism occurs at a second location or a second time (second instance). A record of the second access is stored either in a local memory disposed on the latch or at a remote storage location or both. Access data of recorded accesses is accumulated. An indication of the location of the container at a particular time or when an access occurred is provided. This indication may be in the form of a transmission or an output to a display device, electronic device, printer, facsimile or other output terminal.

The tracking feature also enables authentication of the contents of a compartment. For example, a tractor-trailer may be locked using a latch mechanism as described herein. Upon locking, information relating to the authorized person could be stored in the latch memory and transmitted to a remote storage location. The latch, affixed to the trailer, would also indicate the location, time, contents and authorized agent who locked the latch. This data could be accessed at a subsequent time and/or location to determine whether the latch has been accessed and if the contents have been modified, unloaded, or substituted. Thus, the opening and closing of the trailer can be tracked and monitored over time.

A plurality of locks, as described herein, may also be electronically coupled to one another such that each lock can be independently traced as well as collectively traced. This facilitates a traveler keeping track of multiple containers or pieces of luggage. When more than one lock is associated with an individual, a manifest may be generated that lists the activity of each lock. The locks may also be traced using the GPS system described above and shown in FIG. 2.

The present invention has been described by examples; however, it is also an embodiment of the present invention that the lock, as described, may include means for inputting programmed data to a latch. This could be for example, an input port on the lock, or an input port operatively coupled to the lock or a detachable input module that can be plugged into the lock.

The lock, as described herein, may also include means for detecting engagement of the latch. This may include, for example, an RFID (radio frequency identification) tag, an IR (infrared) tag, a magnetic code reader, a bar code scanner, an optical character scanner or other device or module or facility that detects particular data on a medium.

The lock, as described herein, may also include means for storing data relating to the programmed data capable of engaging the latch. This may be, for example, an electronic storage medium, or memory, such as RAM (Random Access Memory) ROM (Read Only Memory) PROM (Programmable ROM) or other memory.

The lock, as described herein, may also include means for identifying the lock using a coded data representation. This may be for example, a bar code, or other encoded representation or an encrypted representation of data, such as a person's name, address or other identifying data that can be affixed to the lock or compartment and then scanned or decoded or decrypted to enable correlation between the identification data on the lock and a user or owner of the lock.

The lock, as described herein, may also include means for outputting data relating to engagement of the latch. This may be, for example, a printer connection to be coupled to a printing device or a port, such as a USB port or an RJ11 jack, or a wireless port, or an IR port or a card reader to download data from the lock to the storage medium, such as a magnetic card or smart card or other storage medium.

While the present invention has been described in terms of a lock, it is an embodiment of the invention that the lock as described herein may be fabricated as part of the luggage, baggage, rail car, trailer or other compartment or alternatively, may be attachable and detachable to the luggage, baggage, rail car, trailer or other compartment. In either embodiment, the lock can be registered to a user so that if dangerous or prohibited materials are found within the compartment, the owner, or user, of the lock can be identified.

While the present invention has used terms such as "coupled to", "operatively connected", "operatively interconnected", it is to be understood that those terms mean that the components are not necessarily assembled in a specific configuration or that other components may or may not be between, or disposed within the described components.

Thus, the present invention has been described in terms of a method and an apparatus to identify and track compartments, containers and luggage using a latch or tag. One method for establishing profile data that is associated with a latch mechanism includes obtaining personal data associated with a user. This personal data may include a user's name, address, social security number, biometric information, date of birth, access code or other information that can identify a user.

Obtaining an identifier that identifies a latch mechanism, or tag, may be for example, a serial number, an alpha-numeric designation, or barcode data, or other data that identifies a latch mechanism, or piece of luggage, or compartment, or tag.

Associating the personal data with the identifier may be accomplished by matching the personal data and the identifier data. This association can be achieved, for example, by computer program code, or an algorithm, or other correlation process.

Generating profile data for the latch mechanism, or tag as a function of the personal data may include for example, using the personal data to categorize the user. This profile data can be used to trigger additional security precautions or precautionary steps.

Transmitting the profile data to a remote location may include, for example, a network connection, Internet transmission, wireless transmission, or other packet transmission medium, that can transmit the data to a second destination. The destination may be "remote" in that it may be located at a separate location, which may include a computer at a different location in the facility or a location that is further away. Storage location is typically a memory or other electronic storage medium that stores and/or processes data. One example is a database, which may be coupled to a CPU.

Outputting the profile data may include transmitting the data to an output module, such as, for example, a display screen, monitor, LCD, printer, facsimile machine, portable hand-held device, or other destination.

While the present invention has been described with reference to specific embodiments, and applicant has attempted to describe foreseeable equivalents, there may exist other equivalents that are unforeseeable, or insubstantial differences that remain as equivalents.

What is claimed is:

1. A method for establishing profile data that is associated with a latch mechanism comprising:
    obtaining personal data associated with a user;
    obtaining an identifier that identifies a latch mechanism that is associated with a movable object;
    associating the personal data with the identifier;
    assigning a risk level for the latch mechanism as a function of the personal data; and
    storing the personal data and the identifier in the latch mechanism;
    obtaining location data as a function of a location of the latch mechanism; and
    outputting the location data.

2. The method as claimed in claim 1, further comprising: generating profile data for the latch mechanism as a function of the personal data.

3. The method as claimed in claim 2, further comprising: transmitting the profile data to a remote location.

4. The method as claimed in claim 2, further comprising: transmitting the profile data to a storage location.

5. The method as claimed in claim 4, wherein the storage location is a database.

6. The method as claimed in claim 4, further comprising: retrieving the profile data from the storage location.

7. The method as claimed in claim 2, wherein the obtaining step includes obtaining personal data associated with a second user; and
    the generating step includes generating the profile data for the latch mechanism as a function of the personal data associated with the second user.

8. The method as claimed in claim 2, further comprising: outputting the profile data.

9. The method as claimed in claim 2, further comprising: printing the profile data on a medium.

10. The method as claimed in claim 9, wherein the medium is a tag.

11. The method as claimed in claim 9, wherein the medium is a ticket.

12. The method as claimed in claim 2, further comprising: displaying the profile data on an electronic device.

13. The method as claimed in claim 2, further comprising: encoding the profile data; and outputting the profile data.

14. The method as claimed in claim 13, wherein the outputting step further comprises: printing the profile data.

15. The method as claimed in claim 13, wherein the outputting step further comprises: displaying the profile data.

16. The method as claimed in claim 2, further comprising: tracking the profile data; and updating the profile data.

17. The method as claimed in claim 1, further comprising: generating a first indicator as a function of the personal data; and storing the first indicator.

18. The method as claimed in claim 17, further comprising: generating a second indicator as a function of the identifier; and storing the second indicator.

19. The method as claimed in claim 18, further comprising: segregating latch mechanisms as a function of either the first indicator or the second indicator or both the first indicator and the second indicator.

20. The method as claimed in claim 18, further comprising: outputting the second indicator.

21. The method as claimed in claim 20, wherein the outputting step further comprises: printing the second indicator.

22. The method as claimed in claim 17, further comprising: outputting the first indicator.

23. The method as claimed in claim 22, wherein the outputting step further comprises: printing the first indicator.

24. The method as claimed in claim 1, further comprising: modifying the risk level.

25. The method as claimed in claim 1, wherein the output step further comprises: transmitting the location data to an electronic device.

26. The method as claimed in claim 1, wherein the output step further comprises: displaying the location data.

27. The method as claimed in claim 1, further comprising: generating manifest data as a function of contents of a compartment; and storing the manifest data in the latch mechanism.

28. The method as claimed in claim 27, further comprising: outputting the manifest data.

29. The method as claimed in claim 28, wherein the outputting step includes transmitting the manifest data to a remote location.

30. The method as claimed in claim 28, wherein the outputting step includes printing the manifest data.

31. An apparatus for establishing profile data that is associated with a latch mechanism comprising:
means for obtaining personal data associated with a user;
means for obtaining an identifier that identifies a latch mechanism that is permanently associated with a movable object;
means for associating the personal data with the identifier;
means for associating a risk level with the latch mechanism as a function of the personal data;
means for storing the personal data and the identifier in the latch mechanism;
means for obtaining location data as a function of a location of the latch mechanism; and
means for outputting the location data.

32. The apparatus as claimed in claim 31, further comprising:
means for generating profile data for the latch mechanism as a function of the personal data.

33. The apparatus as claimed in claim 32, further comprising:
means for transmitting the profile data to a remote location.

34. The apparatus as claimed in claim 32, further comprising:
means for transmitting the profile data to a storage location.

35. The apparatus as claimed in claim 34, wherein the storage location is a database.

36. The apparatus as claimed in claim 34, further comprising:
means for retrieving the profile data from the storage location.

37. The apparatus as claimed in claim 32, further comprising:
means for outputting the profile data.

38. The apparatus as claimed in claim 32, further comprising:
means for printing the profile data on a medium.

39. The apparatus as claimed in claim 38, wherein the medium is a tag.

40. The apparatus as claimed in claim 38, wherein the medium is a ticket.

41. The apparatus as claimed in claim 32, further comprising:
means for displaying the profile data on an electronic device.

42. The apparatus as claimed in claim 32, further comprising:
means for encoding the profile data; and
means for outputting the profile data.

43. The apparatus as claimed in claim 42, wherein the means for outputting further comprises:
means for printing the profile data.

44. The apparatus as claimed in claim 42, wherein the means for outputting further comprises:
means for displaying the profile data.

45. The apparatus as claimed in claim 32, further comprising: means for tracking the profile data; and
means for updating the profile data.

46. The apparatus as claimed in claim 31, further comprising:
means for generating a first indicator as a function of the personal data; and
means for storing the first indicator.

47. The apparatus as claimed in claim 46, further comprising:
means for generating a second indicator as a function of the identifier; and
means for storing the second indicator.

48. The apparatus as claimed in claim 47, further comprising:
means for segregating latch mechanisms as a function of either the first indicator or the second indicator or both the first indicator and the second indicator.

49. The apparatus as claimed in claim 47, further comprising:
means for outputting the second indicator.

50. The apparatus as claimed in claim 49, wherein the means for outputting further comprises:
means for printing the second indicator.

51. The apparatus as claimed in claim 46, further comprising:
means for outputting the first indicator.

52. The apparatus as claimed in claim 51, wherein the means for outputting further comprises:
means for printing the first indicator.

53. The apparatus as claimed in claim 31, further comprising:
means for modifying the risk level.

54. The apparatus as claimed in claim 31, wherein the means for outputting further comprises:
means for transmitting the location data to an electronic device.

55. The apparatus as claimed in claim 31, wherein the means for outputting further comprises:
means for displaying the location data.

56. A method for establishing profile data that is associated with a latch mechanism comprising:
obtaining personal data associated with a user;
obtaining an identifier that identifies a latch mechanism that is associated with a movable object;
associating the personal data with the identifier;
obtaining the current location of the latch mechanism; and
outputting the location to the person whose data is associated with the latch mechanism.

57. The method as claimed in claim 56, wherein the output step further comprises transmitting the location to an electronic device associated with the person whose data is associated with the latch mechanism.

58. The method as claimed in claim 56, wherein the movable object is a piece of luggage and the output step further comprises displaying the location on an electronic display associated with a luggage carousel.

59. A method for establishing profile data that is associated with a movable object comprising:
obtaining personal data associated with a user of the movable object;
obtaining an identifier that identifies the movable object;
associating the personal data with the identifier;
associating a risk level with the movable object as a function of the personal data; and
wherein the personal data includes the identity of at least one geographic location in which the person whose data is associated with the moveable object has been located.

60. A method for establishing profile data that is associated with a movable object comprising:
obtaining an identifier that identifies the movable object;
obtaining a geographic location at which the object was once located;
associating the identifier with the geographic location; and
associating a risk level with the movable object as a function of the geographic location.

* * * * *